(12) United States Patent
Bhupalam et al.

(10) Patent No.: US 8,990,247 B2
(45) Date of Patent: *Mar. 24, 2015

(54) APPARATUS, SYSTEMS, AND METHODS FOR CLIENT TRANSPARENT VIDEO READDRESSING

(71) Applicant: Cisco Technology, Inc., San Jose, CA (US)

(72) Inventors: Bhaskar Bhupalam, Santa Clara, CA (US); Jayaraman Iyer, San Jose, CA (US); Vivek Kansal, San Jose, CA (US); Biswaranjan Panda, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,619

(22) Filed: Jan. 24, 2014

(65) Prior Publication Data
US 2014/0143378 A1 May 22, 2014

Related U.S. Application Data

(63) Continuation of application No. 13/309,711, filed on Dec. 2, 2011, now Pat. No. 8,639,718.

(51) Int. Cl.
*G06F 7/00* (2006.01)
*G06F 17/30* (2006.01)
*H04L 29/06* (2006.01)
*H04L 29/08* (2006.01)
(Continued)

(52) U.S. Cl.
CPC .......... *H04L 65/601* (2013.01); *H04L 65/4084* (2013.01); *H04L 65/602* (2013.01); *H04L 65/80* (2013.01); *H04L 67/06* (2013.01); *H04N 21/2343* (2013.01); *H04N 21/2393* (2013.01); *H04N 21/2402* (2013.01); *H04N 21/262* (2013.01); *H04N 21/47202* (2013.01); *H04N 21/6131* (2013.01); *H04N 21/6581* (2013.01)
USPC ............ 707/771; 707/781; 709/217; 709/246

(58) Field of Classification Search
CPC .................. H04N 19/00472; H04N 21/23614; H04N 21/2662; H04N 21/41407
USPC ........................................................ 707/771
See application file for complete search history.

(56) References Cited

U.S. PATENT DOCUMENTS 6,345,294 B1 2/2002 O'Toole et al.
6,449,647 B1 9/2002 Colby et al.
(Continued)

OTHER PUBLICATIONS

Berners-Lee T. et al. "Hypertext Transfer Protocol—HTTP/1.0" Network Working Group. May 1996. 61 pages.
(Continued)

*Primary Examiner* — Binh V Ho
(74) *Attorney, Agent, or Firm* — Wilmer Cutler Pickering Hale and Dorr LLP

(57) ABSTRACT

Network operators are striving to find ways to provide stable video services amid a rapid increase in video traffic. In order to provide stable video services with constrained network resources, network operators attempted to reduce video file sizes using a content adaptation engine (CAE). However, network operators failed to efficiently readdress video flows to CAEs. This disclosure provides systems and methods for efficiently readdressing video flows to CAEs.

20 Claims, 11 Drawing Sheets

(51) Int. Cl.
*H04N 21/2343* (2011.01)
*H04N 21/239* (2011.01)
*H04N 21/24* (2011.01)
*H04N 21/262* (2011.01)
*H04N 21/472* (2011.01)
*H04N 21/61* (2011.01)
*H04N 21/658* (2011.01)

(56) References Cited

U.S. PATENT DOCUMENTS

| | | | |
|---|---|---|---|
| 6,850,982 | B1 | 2/2005 | Siegel |
| 7,680,755 | B2 * | 3/2010 | Machani ............... 706/47 |
| 7,707,300 | B1 | 4/2010 | Champagne |
| 7,890,586 | B1 * | 2/2011 | McNamara et al. ......... 709/206 |
| 8,639,718 | B2 | 1/2014 | Bhupalam et al. |
| 2003/0110234 | A1 | 6/2003 | Egli et al. |
| 2004/0039820 | A1 | 2/2004 | Colby et al. |
| 2005/0136942 | A1 | 6/2005 | Timiri et al. |
| 2005/0223248 | A1 * | 10/2005 | Lim et al. ............... 713/300 |
| 2005/0246278 | A1 | 11/2005 | Gerber et al. |
| 2005/0251848 | A1 * | 11/2005 | Al-Janabi ............... 725/135 |
| 2006/0010226 | A1 * | 1/2006 | Hurtta et al. ............. 709/217 |
| 2006/0218301 | A1 | 9/2006 | O'Toole et al. |
| 2010/0226428 | A1 * | 9/2010 | Thevathasan et al. ... 375/240.02 |
| 2010/0281042 | A1 * | 11/2010 | Windes et al. ............ 707/756 |
| 2010/0325674 | A1 * | 12/2010 | Liu ........................... 725/92 |
| 2011/0154477 | A1 | 6/2011 | Parla et al. |
| 2011/0203006 | A1 * | 8/2011 | Gopalakrishnan ........ 726/29 |
| 2011/0289108 | A1 | 11/2011 | Bhandari et al. |
| 2011/0299606 | A1 | 12/2011 | Chen et al. |
| 2012/0054664 | A1 | 3/2012 | Dougall et al. |
| 2012/0203861 | A1 * | 8/2012 | Flack et al. ............... 709/217 |
| 2012/0265901 | A1 * | 10/2012 | Swenson et al. ......... 709/246 |
| 2013/0144979 | A1 | 6/2013 | Kansal et al. |

OTHER PUBLICATIONS

Fielding R. et al. "Hypertext Transfer Protocol—HTTP/1.1" Network Working Group. Jun. 1999. 114 pages.

* cited by examiner

| Video identifier | Source address | Expiration time |
|---|---|---|
| "http://www.youtube.com/watch?v=HPPj6vilBmU" | Cache_1/HPPj6vilBmU | 2010/09/23 |
| "http://www.youtube.com/watch?v=CYdyKqlpCr0" | | |
| "http://vimeo.com/5424527" | Cache_3/5424527 | 2011/10/08 |
| "http://vimeo.com/9834821" | Cache_4/9834821 | 2011/10/15 |

FIG. 6

| Video identifier | Popularity index |
|---|---|
| "http://www.youtube.com/watch?v=HPPj6viIBmU" | 12 |
| "http://www.youtube.com/watch?v=CYdyKqIpCr0" | 42 |
| "http://vimeo.com/5424527" | 32 |
| "http://vimeo.com/9834821" | 88 |

FIG. 7

APPARATUS, SYSTEMS, AND METHODS FOR CLIENT TRANSPARENT VIDEO READDRESSING

RELATED APPLICATIONS

The present application is a continuation application of U.S. patent application Ser. No. 13/309,711, to be issued as U.S. Pat. No. 8,639,718 on Jan. 28, 2014, entitled "SYSTEMS AND METHODS FOR CLIENT TRANSPARENT VIDEO READDRESSING," which is incorporated herein by reference in its entirety. The present application is also related to U.S. patent application Ser. No. 13/309,874 by Kansal et al., filed on Dec. 2, 2011, entitled "SYSTEMS AND METHODS FOR INTELLIGENT VIDEO DELIVERY AND CACHE MANAGEMENT"; and U.S. patent application Ser. No. 13/252,574, by Hsu et al., filed on Oct. 4, 2011, entitled "SYSTEMS AND METHODS FOR CORRELATING MULTIPLE TCP SESSIONS FOR A VIDEO TRANSFER," each of which is herein incorporated by reference in its entirety.

FIELD OF DISCLOSURE

This disclosure relates generally to a system and method for delivering videos and managing a video cache.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology. Such devices can use connections to the wireless networks to download video data.

Increases in video traffic can strain wireless network operators' existing packet core elements, potentially causing overloaded network devices in wireless networks, and network service disruptions. The demand for video data over wireless networks is not expected to slow, especially as more mobile devices become more video-capable, and as users become more dependent on mobile devices. Therefore, wireless network operators are striving to find ways to provide stable video services amid a rapid increase in video traffic.

BRIEF DESCRIPTION OF THE DRAWINGS

FIG. 6 illustrates a popularity table in accordance with certain embodiments;

FIG. 7 illustrates a video cache table in accordance with certain embodiments;

DESCRIPTION OF EXAMPLE EMBODIMENTS

Overview

Figure 1:
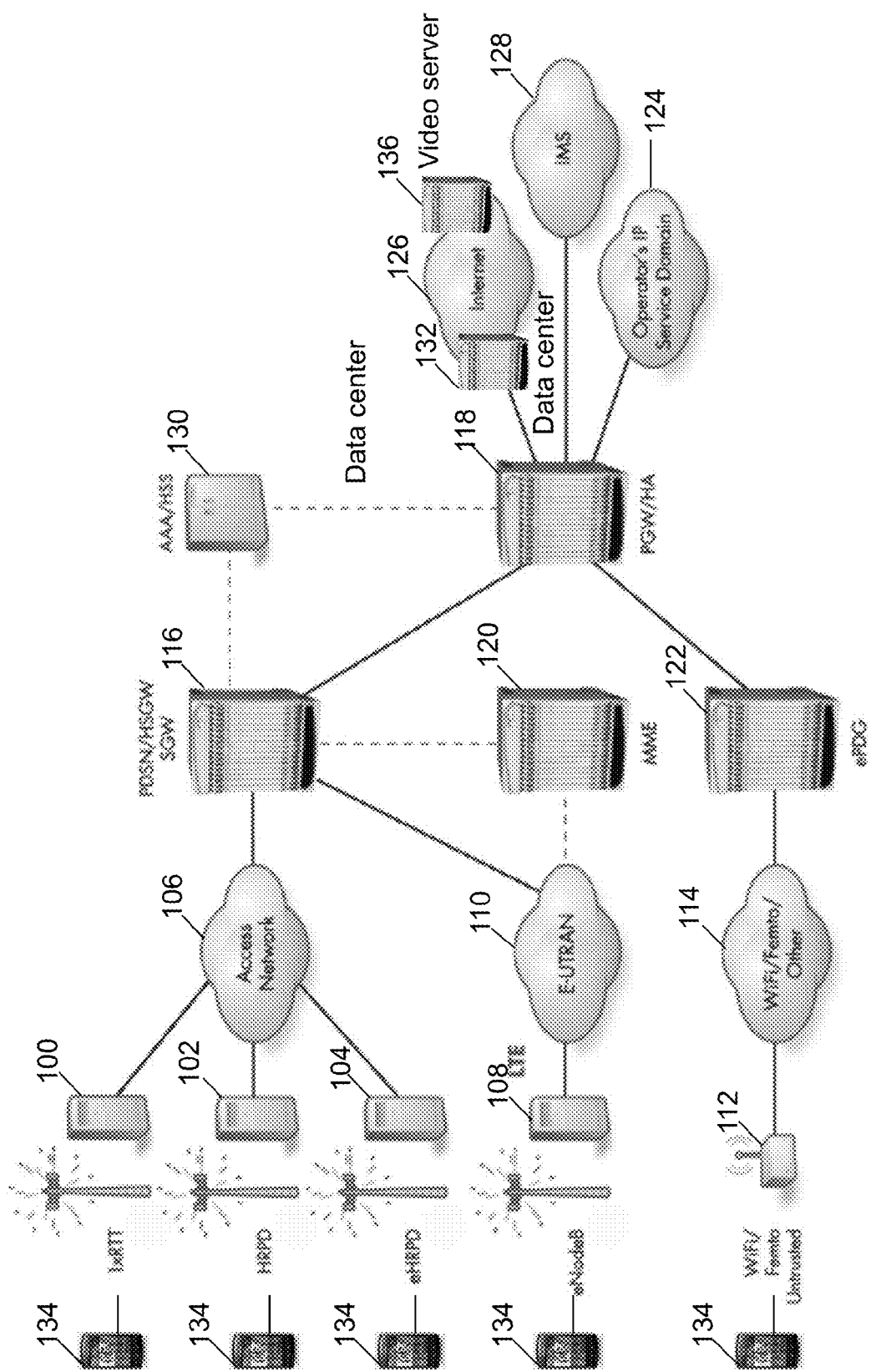
FIGS. 1-2 illustrate a communication network including a long term evolution (LTE) topology in accordance with certain embodiments.

Certain embodiments disclose a method including receiving a first data request from a user equipment, in which the first data request includes an identifier of requested data. The method further includes analyzing one or more L4-L7 headers in the first data request to determine if a data flow associated with the first data request is a video flow. If the data flow associated with the first data request is a video flow, the method further includes selecting a content adaptation engine (CAE) from which an adapted version of the requested data can be retrieved, and sending a second data request to the CAE, in which the second data request includes the identifier of the requested data. In addition, the method includes receiving an adapted version of the requested data from the CAE, and sending the adapted version of the requested data to the user equipment.

Example Embodiments

In order to provide stable video services with constrained network resources, network operators have attempted to reduce the file size of videos before delivering them to users. For example, suppose that a network operator receives a request for a high definition (HD) video (i.e., 1920×1080 pixels), but because the network is busy, the network operator cannot stream the HD video to the user in real-time. One way to deliver this video in real-time is by reducing the file size of the HD video. For example, the network operator can reduce the file size by down-sampling the video to 1280×720 pixels. The network operator could also reduce the file size by adjusting the video quality (e.g., compression rates, color depths) or the frame rate (e.g., the number of frames per second). Adjusting a video to reduce the file size is often called video transcoding. Video transcoding can involve modifying the video compression format. For instance, if user equipment supports a compression format that is more efficient than the video's current compression format, the video can be decompressed and re-compressed using the more efficient compression format.

Network operators can perform video transcoding using a content adaptation engine (CAE). A CAE can be a stand-alone hardware module located between a gateway and a video server. A CAE may be a stand-alone hardware module because video transcoding is a computation-extensive operation. In some cases, a CAE can be emulated using software solutions running on a cloud or a data center.

To prepare an adapted video using a CAE, network operators can implement a mechanism to perform a number of operations on video data. The CAE operations can include retrieving an original, unmodified video from a video server, sending the original video to the CAE, adapting the original video into an adapted video using the CAE, and delivering the adapted video from the CAE. These CAE operations can be coordinated by a gateway through messages exchanged with the CAE.

However, systems and methods for coordinating CAE operations can be inefficient. Suppose that a gateway receives data traffic that may be associated with an unmodified, original video. In one network implementation, the gateway would redirect all the data traffic to the CAE. The redirecting data traffic is also referred to as readdressing data traffic because the address of the data traffic's destination is modified to redirect the data traffic to another network device. By readdressing the data traffic to the CAE, the gateway can rely on the CAE to identify a video flow from the data traffic and to adapt the identified video flow appropriately. However, this implementation is highly inefficient because the gateway readdresses all the data traffic to the CAE, regardless of whether the data flow is adapted by the CAE or not. Therefore, this implementation unnecessarily consumes network resources and also unnecessarily adds latency to non-video traffic.

In another network implementation, the gateway can detect a video flow by itself using shallow packet inspection. Subsequently, the gateway would identify the user equipment associated with the video flow and request the identified user equipment to readdress the video flow to a content adaptation engine (CAE). In essence, the gateway is tricking the user equipment that the CAE is the video content server. However, this implementation may be inefficient because shallow packet inspection can miss or misidentify video flows and missed video flows would not be adapted. Furthermore, this implementation can increase the amount of wireless data traffic between the gateway and the user equipment because the gateway has to send a readdress request to the user equipment.

In yet another implementation, the gateway uses an Internet content adaptation protocol (ICAP) to readdress a video flow to the CAE. A gateway performs a shallow packet inspection to determine if any of the packets are associated with a video. When a gateway identifies a video flow, the gateway operates as a proxy server to forward the video flow to the CAE using an Internet content adaptation protocol (ICAP). Once the adapted video is ready, the gateway can receive the adapted video from the CAE using the ICAP and deliver the adapted video to the user equipment. However, this implementation may be inefficient because shallow packet inspection can miss or misidentify video flows. Furthermore, this implementation unnecessarily consumes network resources because the CAE receives the original video from the gateway instead of receiving the video directly from the video server.

The disclosed systems and methods illustrate a client-transparent video readdressing (CVR) scheme. The disclosed systems and methods implementing the CVR scheme can identify and readdress a video flow to a content adaptation engine in a manner transparent to user equipments. The CVR scheme can include identifying a video flow using deep packet inspection, selecting a CAE from a pool of CAEs to adapt the identified video flows, and redirecting video flows associated with the video to the selected CAE in a manner transparent to user equipment. These functionalities can be implemented using a network device on a user plane, for example, a gateway.

As used herein, video content includes video data that can be stored in a non-transitory computer readable medium. As used herein, a video flow includes a stream of data units that carries video content from one location to another location in a communication network. As used herein, video traffic includes a plurality of video flows.

In certain embodiments of the CVR scheme, a gateway can identify a video flow from video traffic by inspecting data requests associated with the video traffic. In other embodiments, a gateway may identify a video flow by inspecting responses to data requests. These inspections of data requests and/or responses to data requests can include deep packet inspection (DPI), which includes analyzing one or more headers such as a layer 4 (L4), layer 5 (L5) header, a layer 6 (L6) header, and a layer 7 (L7) header (collectively referred to as L4-L7 headers).

Deep packet inspection can be distinguished from shallow packet inspection in that while shallow packet inspection yields only low-level information about the data transfer, deep packet inspection yields high-level context information about the data transfer. Shallow packet inspection is directed to analyzing low-level headers such as L3-L4 headers, whereas deep packet inspection includes analyzing high level headers such as L4-L7 headers. Shallow packet inspection can analyze the IP address and the transmission protocol associated with a data flow. This enables identifying whether a data flow is associated with HTTP or whether a data flow is directed to a particular IP address. However, shallow packet inspection cannot identify whether the data flow carries video data or text data. In contrast, deep packet inspection can analyze the commands and/or the data content associated with a data flow and determine whether the data flow carries video data or text data.

In certain embodiments, a gateway can be configured to select one of a plurality of CAEs for adapting identified video flows. The CAE selection can be based on the operating condition of the CAEs. For example, a gateway can regularly send a heartbeat message to the CAEs to determine if any of the CAEs are not functional. The gateway can also monitor the load condition at each of the CAEs. The gateway can use the gathered operating condition of the CAEs to select one of the CAEs for video adaptation.

FIG. 1 illustrates a communication network that implements a client-transparent video readdressing (CVR) scheme in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology, can use a transceiver shown generally at 112 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WiFi/Femto/other transceiver 112.

On the packet core side, the anchor gateway can communicate with the operator's IP service domain 124, the internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
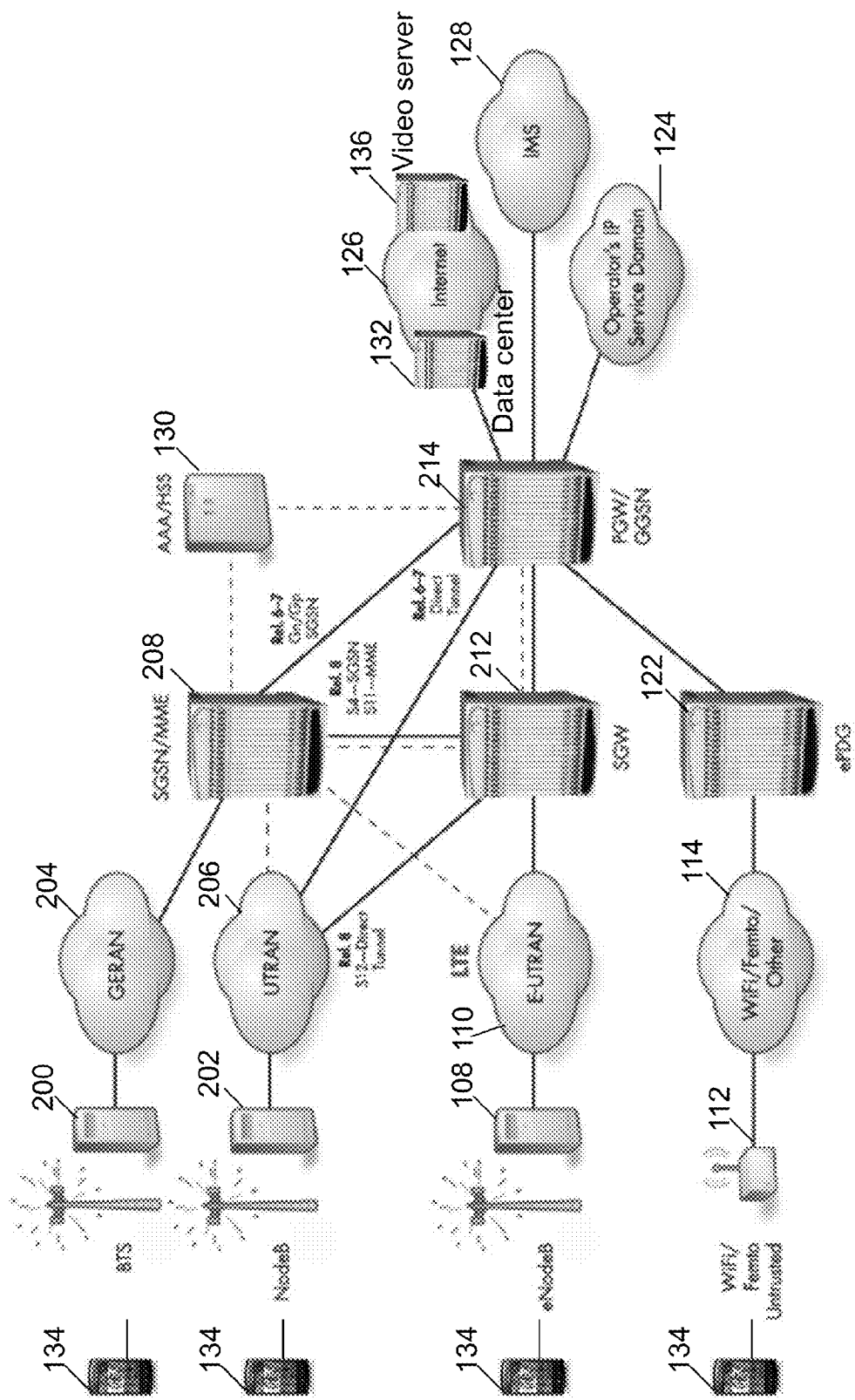

FIG. 2 illustrates a communication network that implements a client-transparent video readdressing (CVR) scheme in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, parts of the client-transparent video readdressing (CVR) system can be implemented on gateways, such as PGW/HA 118, PDSN/HSGW/SGW 116, SGSN/MME 208, PGW/GGSN 214, or SGW 212 and/or data centers 132. The gateways can access and maintain information relating to the communication session, the subscriber, the radio bearers, and the policies relating to the communication session. The gateways may be used to provide various services to a UE 134 and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
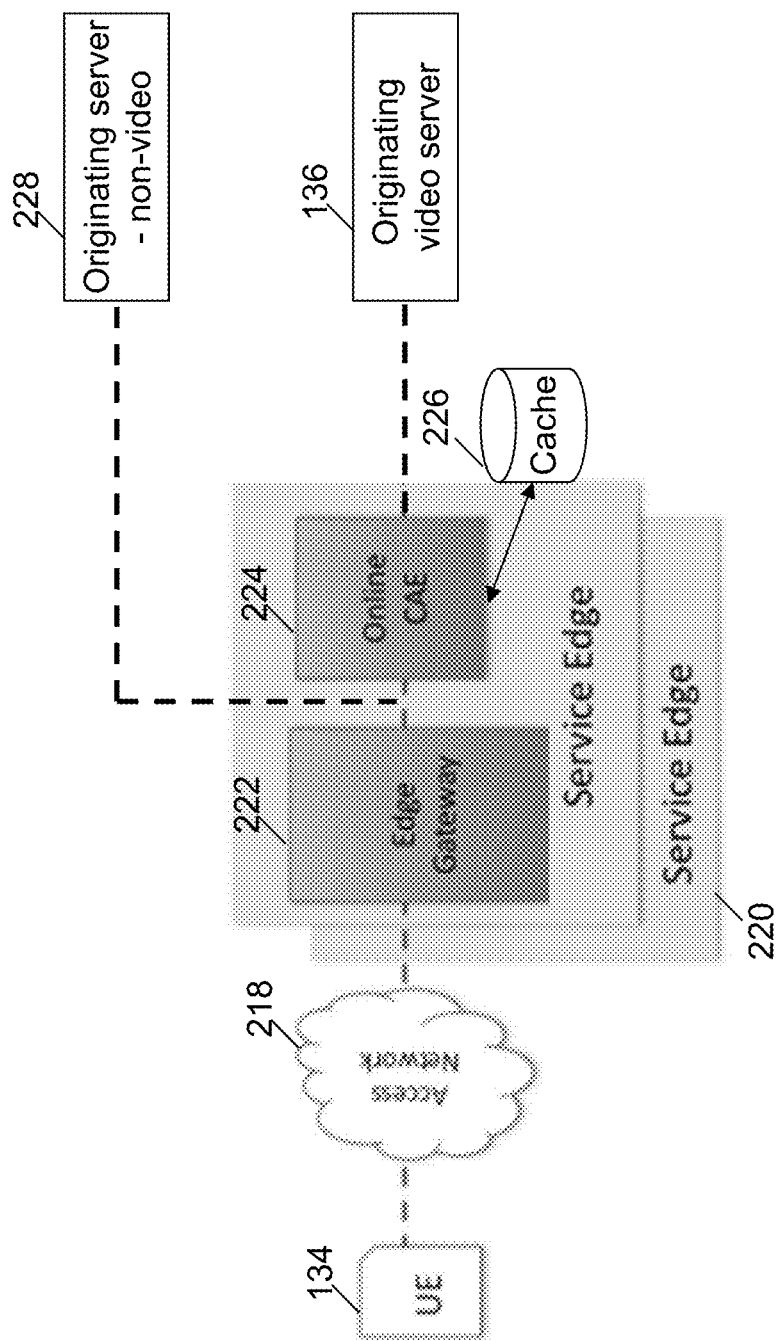
FIG. 3 illustrates a communications network in which a client-transparent video readdressing (CVR) scheme is implemented in accordance with certain embodiments.

FIG. 3 illustrates a communications system that implements a client-transparent video readdressing (CVR) scheme in accordance with certain embodiments. FIG. 3 includes a user equipment (UE) 134, an access network 218, a service edge 220 that includes a gateway 222 and a content adaptation engine (CAE) 224, a video cache 226 in communication with the CAE 224, an originating video server 136, and an originating server for non-video data 228.

The gateway 222 can monitor its data flows to determine if any of its data flows is associated with videos. For example, the gateway 222 can analyze data requests from UEs 134 to determine if the requested data include videos. The gateway 222 can also analyze responses to data requests to determine if the requested data include videos. If a data flow is associated with a video, then the gateway 222 selects one of the CAEs, establishes a connection with the selected CAE 224, and forwards the data request associated with the identified data flow to the CAE 224. When the CAE 224 receives the data request from the gateway 222, the CAE 224 downloads the requested video from the originating video server 136 and adapts the requested video. Then the CAE 224 delivers the adapted video to the gateway 222, which then forwards the adapted video to the UE 134. The CAE 224 may cache the adapted video at the video cache 226 so that if another user equipment requests the same video, the CAE 224 can deliver the adapted video to the user equipment directly from the video cache 226.

Figure 4:
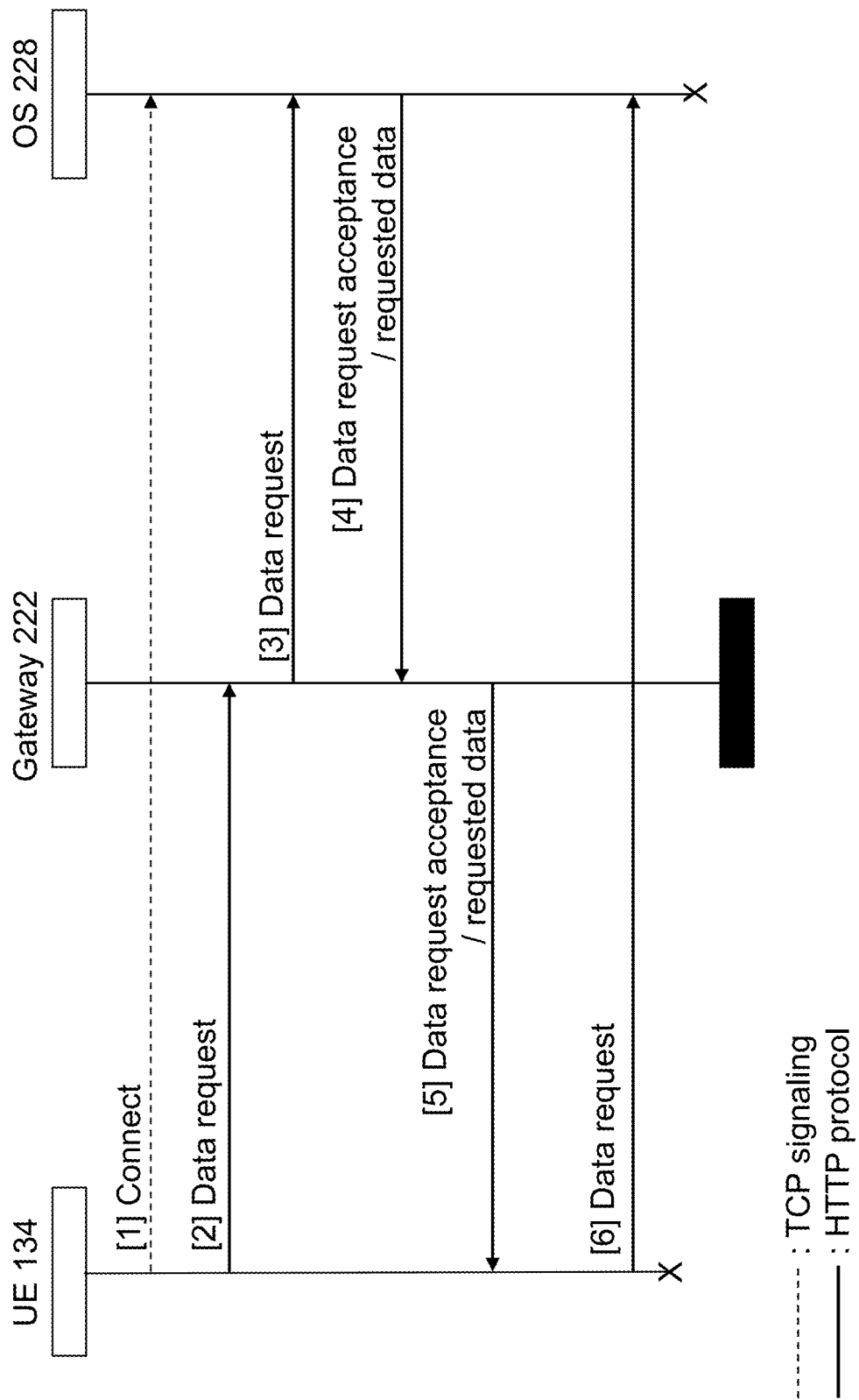
FIG. 4 shows a flow diagram illustrating a CVR scheme in accordance with certain embodiments, in which the data flow is not associated with videos.

FIG. 4 shows a message flow diagram between network devices in accordance with certain embodiments under the CVR scheme. FIG. 4 illustrates how a gateway 222 manages a data flow when the data flow is not associated with a video. In step 1, the UE 134 establishes a connection with a gateway 222. This connection can be a transmission control protocol (TCP) connection. In step 2, the UE 134 sends a data request to the gateway 222. The data request can include a data identifier that identifies the requested data, the source address indicating the IP address of the UE 134, and the destination address indicating the originating server. The data identifier can be formatted as a uniform resource identifier (URI). Since FIG. 4 deals with a scenario in which the requested data is not a video, the destination address would specify the originating server for non-video data 228. The source address and the destination address in the data request can be formatted as an Internet Protocol (IP) address. This data request can include a hypertext transfer protocol (HTTP) get request.

The gateway 222 can analyze the received data request to determine if the data request is for videos. To this end, the gateway 222 can perform deep packet inspection of the received data request. In some embodiments, DPI includes matching data request's high level headers (e.g., L4-L7) to the predetermined tags that are associated with videos. For example, if the data request is a HTTP Request, DPI can include analyzing the HTTP request headers. If the HTTP request header indicates that the hostname of the requested data is youtube.com, and if the gateway 222 has youtube.com as one of the predetermined tags associated with videos, then the gateway 222 can tag the data flow associated with this data request as a video flow. In certain embodiments, the list of predetermined tags can include one or more of the following hostnames: video.*.com, tv.*.com, www.youtube.com, www.hulu.com, www.vimeo.com, www.ted.com, blip.tv.

In other embodiments, DPI includes analyzing the name of the requested data's originating server. For example, if the data request is a HTTP request, analyzing the name of the originating server includes analyzing the HTTP Request URL. If the Request URL field of the HTTP request identifies a video server, then the gateway 222 can tag the associated data flow as a video flow.

Since FIG. 4 deals with a scenario in which the data request is not requesting a video, the deep packet inspection of the data request would indicate that the data request is not associated with a video. Therefore, in step 3, the gateway 222 simply forwards the data request from the UE 134 to the destination indicated in the data request. In certain embodiments, the gateway 222 can also store a copy of the data request in a local memory. The gateway 222 keeps a copy of the data request so that if a later inspection of the data flow indicates that the data flow is associated with a video, the gateway 222 can relay the copied data request to the CAE. This scenario is described in more depth in FIG. 5, step 5.

In step 4, the originating server 228 responds to the data request by sending a data request acceptance response. The originating server 228 can also send the requested data along with the response. The data request acceptance response can include the data identifier of the requested data. If the data request was a HTTP get request, then the data request acceptance response can be a HTTP 200 OK response.

In certain embodiments, to confirm that this data flow is not associated with videos, the gateway 222 can inspect the data request acceptance response. This inspection may entail deep packet inspection (DPI) of the data request acceptance response. If the data request acceptance response is a HTTP Response, DPI can include matching the HTTP Response header to one of the known video types. If the HTTP Response header indicates that the requested data is one of the known video types, then the gateway can tag the data flow associated with this HTTP Response as a video flow. The known video types can include known video standards, for example, a MPEG-4 or H.264.

In certain embodiments, to confirm that this data flow is not associated with videos, the gateway 222 can perform deep packet inspection on the content of the requested data. For example, if the data content is formatted as a HTTP payload, the gateway 222 can retrieve the data content from the HTTP payload. The gateway 222 can then analyze the header of the data content to determine the format of the requested data content. If the format of the requested data content is one of known video formats, such as a MPEG-4 or H.264, then the gateway can tag the data flow associated with this data content as a video flow. Since FIG. 4 deals with a scenario in which the requested data is not a video, the DPI would indicate that the data request acceptance response is not associated with a video. Upon confirming that the data flow is not associated with a video, the gateway 222 can remove the copied data request stored in step 3.

In step 5, the gateway 222 relays the data request acceptance response to the UE 134. In step 6, if the gateway 222 receives additional data requests from the UE 134 over the same data connection established in step 1, or if the gateway 222 receives additional data requests from the UE 134 over a data connection that is correlated with the data connection established in step 1, then the gateway 222 routes these data requests to the originating server 228 without performing the DPI on these requests. This feature is called connection persistency. The connection persistency feature is described in depth with respect to step 13 in FIG. 5.

Figure 5:
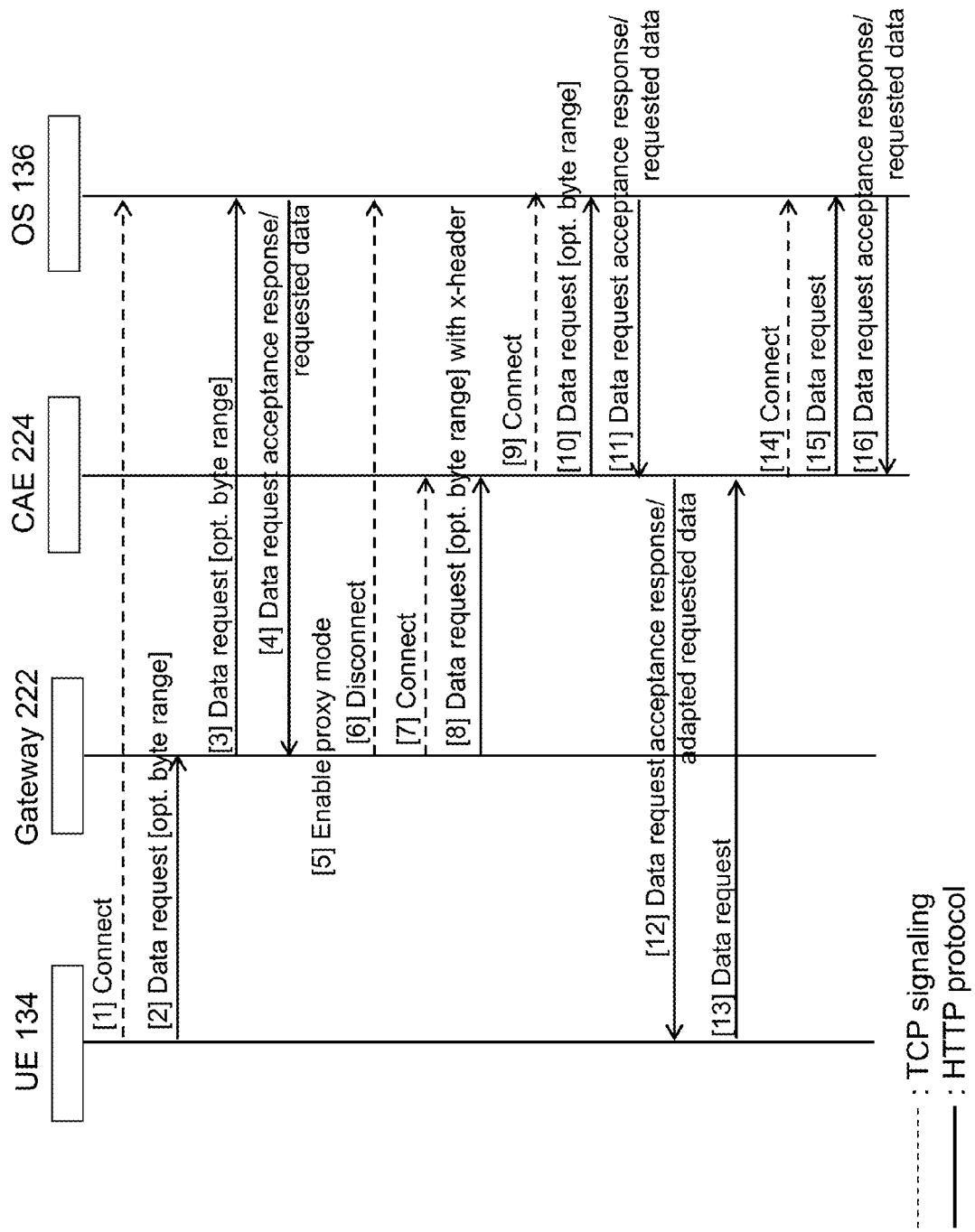
FIG. 5 shows a flow diagram illustrating a CVR scheme in accordance with certain embodiments, in which the data flow is associated with videos.

FIG. 5 shows a message flow diagram between network devices in accordance with certain embodiments under the CVR scheme. FIG. 5 illustrates how a gateway 222 manages a data flow when the data flow is associated with a video. Steps 1-2 are substantially identical to steps 1-2 in FIG. 4. In FIG. 5, when the data request is associated with a video, the data request can optionally indicate which portion of the video is being requested by indicating a byte range. This data request can include a hypertext transfer protocol (HTTP) get request or a HTTP partial get request.

As discussed earlier with respect to FIG. 4, the gateway 222 can analyze the received data request to determine if the data request is requesting videos. If the DPI indicates that the data request is associated with a video, then the gateway can skip steps 3-4 and go to step 5 directly; if the DPI indicates that the data request is not associated with the video, then the gateway 222 can store a copy of the data request in a local memory and go to step 3, as discussed in FIG. 4.

In step 3, the gateway 222 forwards the data request from the UE 134 to the destination indicated by the data request without any modifications. Since FIG. 5 deals with a scenario in which the requested data is a video, the destination indicated by the data request is the originating video server 136.

In step 4, the originating video server 136 responds to the data request with a data request acceptance response. Along with the response, the video server 136 can also send the requested data to the gateway 222. The data request acceptance response can include the data identifier associated with the data request acceptance response. If the data request was a HTTP get request, then the data request acceptance response can be a HTTP 200 OK response.

To confirm that this data flow is not associated with videos, the gateway 222 can inspect the data request acceptance response and/or the content of the requested data. As described with respect to FIG. 4, this inspection may entail DPI of the data request acceptance response and/or the content of the requested data. If the DPI indicates that the data flow is not associated with a video, then the gateway 222 relays the data request acceptance response as in FIG. 4. If the DPI indicates that the data flow is associated with a video, then the gateway 222 proceeds to step 5.

When a gateway 222 detects a video flow, the gateway 222 drops the data request acceptance response and/or the video received over that video flow. Then, the gateway 222 receives an adapted version of the requested video from a CAE and delivers the adapted video to the UE 134. To this end, in step 5, the gateway 222 enables a proxy mode. If the connection in step 1 is a TCP connection, the gateway 222 in the proxy mode behaves as a TCP proxy. In step 6, the gateway 222 disconnects the connection with the video server 136, and in step 7, the gateway 222 establishes a new connection with a CAE 224. The new connection can be a TCP connection.

In certain embodiments, the network can have multiple CAEs. In this case, in step 7, before establishing a new connection with a CAE, the gateway 222 selects one of the CAEs. The CAE selection can be random, round-robin, or adaptive. In a random CAE selection mode, the gateway 222 randomly selects one of the CAEs. In a round-robin CAE selection mode, the gateway 222 selects the CAEs sequentially. For example, if the previous video flow was assigned to $CAE_{(n-1)}$, the current video flow is assigned to $CAE_n$. If the network does not have $CAE_n$, then the current video flow is assigned to $CAE_1$.

In an adaptive CAE selection mode, the gateway 222 selects a CAE based on the CAE's load condition. For example, if $CAE_m$ is using 99% of its computational power to adapt other videos and if $CAE_n$ is using 1% of its computational power to adapt other videos, then the gateway 222 can select $CAE_n$ for the current video flow. Such an adaptive CAE selection scheme can reduce the load imbalance across the CAEs and reduce the risk of CAE failures. The gateway 222 can receive the CAE's load condition information from each of the CAEs by querying the CAEs over a control plane.

In some embodiments, the gateway 222 can monitor CAE failures. For example, a gateway can send a heartbeat message to each of the CAEs to determine if any of the CAEs has failed. If a CAE does not respond, and after a configurable number of retries and timeouts, the gateway can mark the state of the CAE as Down. The gateway can also generate a simple network management protocol (SNMP) Server-State-Down trap message, indicating that the unresponsive CAE is down and unavailable. When a configurable dead-time timer expires, the gateway can send another heartbeat message to the down CAE, and if the CAE sends a positive response indicating that it is back up, the gateway can mark the state of the CAE as Up and generates an SNMP Server-State-Up trap message. The SNMP Server-State-Up trap message would indicate that the CAE is back up and available. The gateway 222 can use the CAE failure information during the CAE selection so that the gateway 222 selects a functional CAE for the current video flow.

In step 8, the gateway 222 sends a new data request to the CAE 224. The new data request can indicate the requested video using the video identifier in the data request received in step 2. The new data request can include a source address field indicating the IP address of the UE 134 and a destination address field indicating the CAE 224. The new data request can further include additional information, for example, (1) the IP address of the originating video server 136, (2) the IP address of the user equipment 134 associated with the data request, and if the established connection is a TCP connection, (3) the TCP port associated with the TCP connection. The gateway 222 can format the new data request as a HTTP get request or a HTTP partial get request, and include the additional information using X-headers. X-headers are non-standard or proprietary add-ons to the regular fields in an HTTP header.

In step 9, the CAE 224 analyzes the new data request and determines if the CAE 224 already has an adapted version of the requested video in the video cache 226. In certain embodiments, the CAE 224 uses a video cache table to determine if the adapted version of the requested video is already available in the video cache 226. FIG. 6 shows a video cache table in accordance with certain embodiments. The video cache table can include three columns: the first column indicates a video using a video identifier, the second column indicates a source address from which the adapted video can be downloaded, and the third column indicates an expiration time at which the source address in the second column is no longer valid. The source address in the second column can be formatted as a uniform resource identifier (URI), an Internet protocol (IP) address, or a proprietary internal address.

The CAE 224 can use the video cache table the following way to determine if the requested video is already available in a video cache 226. When the CAE 224 receives a data request from the gateway 222, the CAE 224 can retrieve, from the video cache table, the source address and the expiration time associated with the requested video. If the source address field in the video cache table is not empty and if the expiration time associated with the source address has not yet passed, then the CAE 224 determines that the adapted video is available in the video cache 226. If the source address field in the video cache table is empty and/or if the expiration time associated with the source address has passed, then the CAE 224 determines that the adapted video is not available in the video cache 226.

If the CAE 224 already has an adapted version of the requested video in the video cache 226, the CAE 224 can go directly to step 12; if the CAE 224 does not have an adapted version of the requested video in the video cache 226, the CAE 224 establishes a data connection with the originating server 136. The data connection can be a TCP connection. The CAE 224 can use the information in the data request's x-header to establish this data connection. For example, the CAE 224 uses the IP address of the originating video server 136 in the x-header to determine which video server 136 to establish a connection with. The CAE 224 also uses the TCP port number in the x-header to determine how to set up a data connection with the video server 136.

In step 10, the CAE 224 relays the data request to the originating video server 136. The data request can indicate the requested video by including the video identifier of the requested video. The source address of this data request can indicate the IP address of the CAE 224 and the destination address of the data request can indicate the originating video server 136. This data request triggers the originating video server 136 to send the requested video to the CAE 224 instead of the UE 134. In step 11, the originating server 136 accepts the data request and sends a data request acceptance response to the CAE 224. In this step, the originating server 136 can also send the requested video to the CAE 224. The data acceptance response can be formatted as an HTTP 200 ok response, and the video can be formatted as an HTTP payload.

Once the CAE 224 receives the original version of the requested video, the CAE 224 adapts the received video for the UE 134. In certain embodiments, the CAE 224 can adapt one or more of the following video characteristics: the frame size, the aspect ratio, the compression rate, compression format, motion vector estimate, and the frame rate. The following paragraphs illustrate how the CAE 224 adapts these video characteristics in accordance with certain embodiments.

The CAE 224 can adapt the video's frame size or the frame's aspect ratio to match the frame size to the UE's screen. Adapting the frame size and/or the aspect ratio may involve decoding a frame, down-sampling the frame, resizing the frame, and re-encoding the frame with the possible reuse of motion vectors. The CAE 224 can also adapt the video compression rate. This can involve modifying the quantization scale of discrete cosine transform (DCT) coefficients or modifying the quantization scale of colors.

In addition, the CAE 224 can also modify the compression format of the videos. For example, if a video is encoded using MPEG 2 but the CAE 224 can encode the video using a more efficient compression algorithm such as H.264, then the CAE 224 can decode the video and re-encode the video using the more efficient compression format. Instead of re-encoding the video using a different compression format, the CAE 224 can also use the same compression format but modify the motion vector estimates for the compressed video. For example, if the original video was compressed using inaccurate motion vectors, then the CAE 224 can re-compress the video using more accurate motion vectors. To this end, the CAE 224 can decode the video, estimate better motion vectors for the video, and re-encode the video using the better motion vectors.

The CAE 224 can also adapt the video frame rate. This may involve temporally sub-sampling the video frames or dropping one or more B frames (i.e., bi-predictive picture). The CAE 224 can determine which of these video characteristics should be adapted based on its load condition and the latency requirements from the network.

In step 12, the CAE 224 relays the data request acceptance response to the UE 134. In this step, the CAE 224 can also send the adapted version of the requested video to the UE 134. In step 13, if the gateway 222 receives additional data requests from the UE 134 over the same data connection established in step 1, or if the gateway 222 receives additional data requests from the UE 134 over a data connection that is correlated with the data connection established in step 1, then the gateway 222 routes these data requests to the CAE 224 without performing the DPI on these requests. As presented above, this feature is called the connection persistency.

Connection persistency is useful because this feature can ensure that a UE 134 does not download portions of a single video from multiple network devices. Suppose that a UE 134 sends multiple HTTP partial get requests to the gateway 222 to download different portions of the same video in parallel. Without the connection persistency feature, the gateway 222 may route each of these partial get requests to different network devices. For example, the gateway 222 can route the first partial get request to a first CAE that had cached an adapted version of the video, whereas the same gateway 222 can route the second partial get request to a second CAE that had not cached an adapted version of the video. This can cause the video quality variations and the packet latency variations across different parts of the video, thereby degrading the user experience. The connection persistency feature resolves these issues.

The connection persistency can be implemented using a persistency table. In certain embodiments in which the data connection is established using TCP, the persistency table can have two columns, one column indicating the source port of the TCP data flow and another column indicating the network device to which the TCP data flow should be readdressed. When a gateway 222 receives a data request, the gateway 222 can identify the TCP source port associated with the data request (i.e., TCP data flow), search the persistency table to identify the network device to which the data request should be readdressed, and proxy the data request to the identified network device. The gateway 222 can identify the TCP source port associated with the data request by reading the source port field of the L4 (TCP) header in the data request. If the persistency table does not have an entry associated with the identified TCP source port, the gateway 222 can proceed with a DPI of the data request to determine the destination of the data request.

In certain embodiments, connection persistency can be enforced across TCP connections. Suppose that a UE 134 sends multiple HTTP partial get requests to the gateway 222 over multiple TCP connections. In this case, the gateway 222 can correlate the TCP connections to identify TCP connections that are downloading different parts of the same video. Upon identifying correlated TCP connections, the gateway 222 can assign the same destination network device to these TCP connections using the persistency table. This enforces the connection persistency feature across these correlated TCP connections. Methods and systems for correlating TCP connections is disclosed in a related U.S. patent application Ser. No. 13/252,574, by Hsu et al., filed on Oct. 4, 2011, entitled "SYSTEMS AND METHODS FOR CORRELATING MULTIPLE TCP SESSIONS FOR A VIDEO TRANSFER", which is herein incorporated by reference in its entirety.

In certain embodiments, the CAE 224 can track the popularity of adapted videos. The popularity of adapted videos is measured using a popularity index, which is maintained using a popularity table. FIG. 7 shows a popularity table in accordance with certain embodiments. This popularity table has two columns: the first column indicates a video using a video identifier and the second column indicates a popularity index associated with the video in the first column. In some embodiments, the popularity table can be merged with the video cache table of FIG. 6 into a single table.

The CAE 224 can compute popularity indices based on the number of times the associated video was requested by users. For example, the CAE 224 can maintain a counter for a video, and whenever the CAE 224 receives a data request for the video, as in step 8, the CAE 224 can increase the value of the counter for the video. The CAE 224 can then derive a popularity index for the video using the value of the counter. In certain embodiments, the counter value can be the popularity index.

While updating the popularity table, the CAE 224 can determine if the popularity index associated with the video is higher than a predetermined popularity threshold. In certain embodiments, if the popularity index associated with a video is greater than a predetermined popularity threshold, and if the CAE 224 does not have an adapted version of the video in the video cache 226, then the CAE 224 can prepare an adapted version of the video and store it in the video cache 226.

In certain embodiments, the CAE 224 can cache the adapted video prepared in step 11. In other embodiments, the CAE 224 can prepare another version of the adapted video and cache the newly adapted video. This newly adapted video can be more extensively adapted to the network compared to the adapted video prepared in step 11 because the CAE 224 does not have to provide the newly adapted video to the UE 134 in real-time. Therefore, the CAE 224 can take as much time as it needs to thoroughly adapt the video. For example, while thorough adaptation schemes involving compression format modification or motion vector re-estimation may be computationally too expensive for real-time video transcoding, these adaptation schemes are manageable for off-line video transcoding. Therefore, the off-line video transcoding can provide better adapted videos.

Steps 14-16 of FIG. 4 illustrate the off-line video transcoding. In step 14, the CAE 224 establishes a data connection with the video server 136. This data connection can be a TCP connection. The CAE 224 can use the x-header information from step 8 to establish this data connection. For example, the CAE 224 uses the IP address of the originating video server 136 in the x-header to determine which video server 136 to establish the connection to. The CAE 224 also uses the TCP port number in the x-header to determine how to set up the TCP connection with the video server 136.

In step 15, the CAE 224 sends a data request to the video server 136. The data request can include the video identifier of the video that has become popular. The source address of this data request can indicate the IP address of the CAE 224 and the destination address of the data request can indicate the originating video server 136. This data request can be a HTTP get request. In certain embodiments, the CAE 224 downloads the entire video even if the original data request from the UE 134 only requested a portion of the video.

In step 16, the CAE 224 receives the requested video from the video server 136 and adapts the received video for the video cache 226. As discussed above, the CAE 224 can adapt one or more of the following video characteristics: the frame size, the aspect ratio, the compression rate, compression format, motion vector estimate, and the frame rate.

Figure 8:
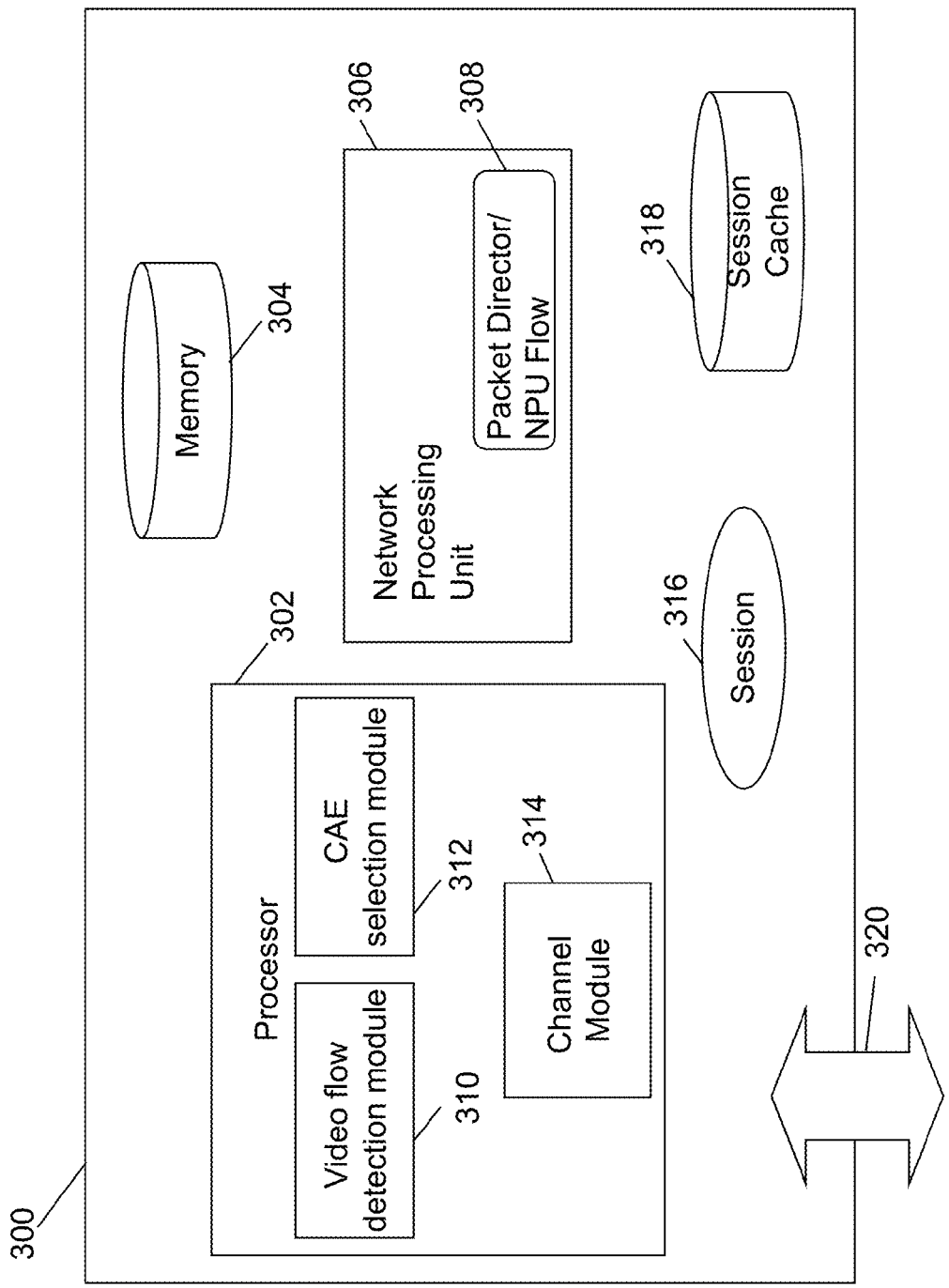
FIG. 8 shows a logical diagram of a gateway in accordance with certain embodiments.

FIG. 8 illustrates a logical view of a gateway 300 in accordance with certain embodiments. The gateway 300 can include one or more of a processor 302, a memory 304, a network processing unit (NPU) 306, a packet director/NPU flow 308, a video flow detection module 310, a CAE selection module 312, a channel module 314, a session 316, a session cache/database 318, and an interface 320. The processor 302 can include the video flow detection module 310, the CAE selection module 312, and the channel module 314.

The video flow detection module 310 is configured to detect video flows. In certain embodiments, the video flow detection module 310 analyzes data requests and/or responses to data requests, collectively referred to as flow setup messages. The analysis of flow setup messages can include deep packet inspection (DPI) of the flow setup messages such as a data request or a response to a data request. The video flow detection module 310 can also be configured to perform deep packet inspection on the data content (i.e., payload) of the data flow.

The CAE selection module 312 is configured to select one of a plurality of CAEs to adapt a video. The CAE selection can be random, round-robin, or adaptive. The CAE selection module 312 can also monitor the CAE failures. For example, a CAE selection module 312 can send a heartbeat message to each of the CAEs to determine if any of the CAEs has failed. The CAE selection module 312 can use the CAE failure information during the CAE selection.

The video flow detection module 310 and the CAE selection module 312 can be implemented in software using the memory 304 such as a non-transitory computer readable medium, a programmable read only memory (PROM), or flash memory. The software can run on a processor 302 that executes instructions or computer code. The video flow detection module 310 and the CAE selection module 312 may also be implemented in hardware using an application specific integrated circuit (ASIC), programmable logic array (PLA), or any other integrated circuit.

An interface 320 can provide an input and/or output mechanism to communicate with other network devices. The interface 320 can provide communication with other gateways, video servers, and UE 134, as well as other core network nodes to send and receive control data. The interface 320 can be implemented in hardware to send and receive signals in a variety of mediums, such as optical, copper, and wireless, and in a number of different protocols some of which may be non-transient and/or non-transitory.

Figure 9:
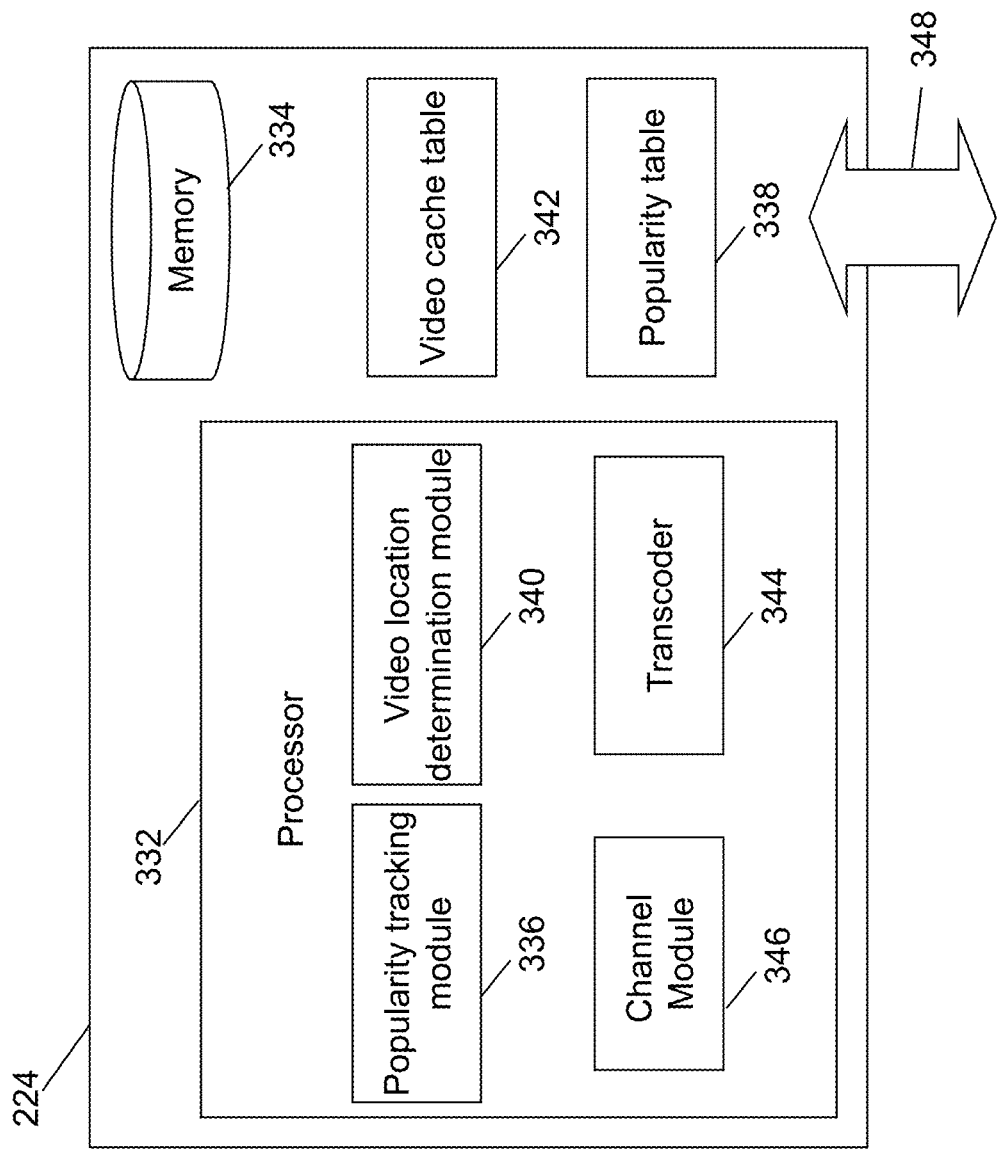
FIG. 9 shows a logical diagram of a content adaptation engine (CAE) in accordance with certain embodiments.

FIG. 9 illustrates a logical view of a content adaptation engine (CAE) 224 in accordance with certain embodiments. The CAE 224 can include one or more of a processor 332, a memory 334, a popularity tracking module 336, a popularity table 338, a video location determination module 340, a video cache table 342, a transcoder 344, a channel module 346, and an interface 348. The processor 332 can include the popularity tracking module 336, the video location determination module 340, the channel module 346, and the transcoder 344.

A transcoder 344 is configured to convert a video into another video, often with a reduced file size. The transcoder 344 can adapt one or more of the following video characteristics: the frame size, the aspect ratio, the compression rate, compression format, motion vector estimate, and the frame rate. The transcoder 344 can be implemented in software using the memory 304 such as a non-transitory computer readable medium, a programmable read only memory (PROM), or flash memory. The software can run on a processor 302 that executes instructions or computer code. The transcoder 344 may also be implemented in hardware using an application specific integrated circuit (ASIC), programmable logic array (PLA), or any other integrated circuit.

A popularity tracking module 336 is configured to track popularity indices of videos and maintain the popularity indices using a popularity table 338. FIG. 6 shows a popularity table 338 in accordance with certain embodiments. The popularity tracking module 336 can compute the popularity index from the number of times a video was requested by users.

A video location determination module 340 is configured to determine the location of the adapted videos in the video cache. In certain embodiments, the video location determination module 340 can use a video cache table 342 to determine the location of a video. FIG. 7 shows a video cache table 342 in accordance with certain embodiments.

The popularity tracking module 336 and the video location determination module 340 can be implemented in software using the memory 304 such as a non-transitory computer readable medium, a programmable read only memory (PROM), or flash memory. The software can run on a processor 302 that executes instructions or computer code. The popularity tracking module 336 and the video location determination module 340 may also be implemented in hardware using an application specific integrated circuit (ASIC), programmable logic array (PLA), or any other integrated circuit. The popularity table 338 and the video cache table 342 can be implemented using the memory 304 such as a non-transient computer readable medium, a programmable read only memory (PROM), or flash memory.

User Equipment and Gateway

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

The client-transparent video readdressing (CVR) scheme described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 10:
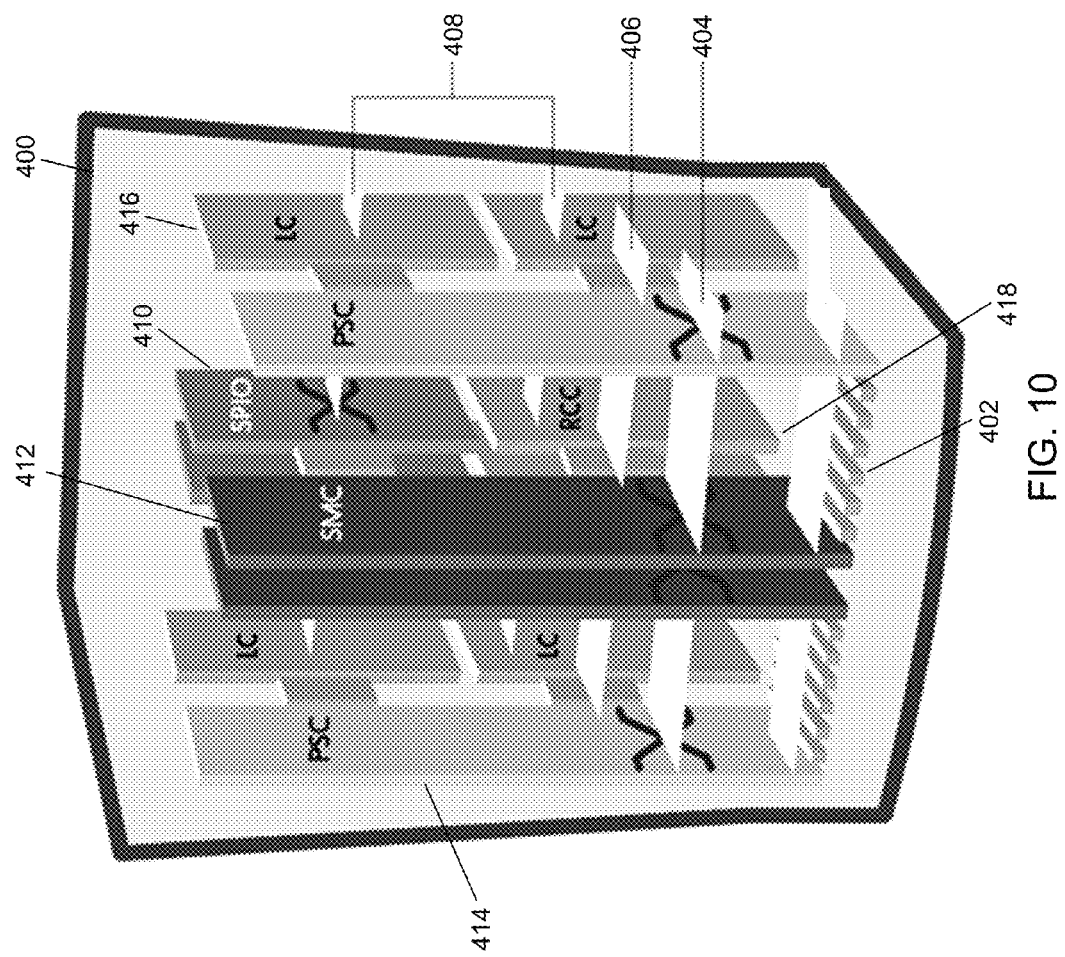
FIG. 10 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 10 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 11:
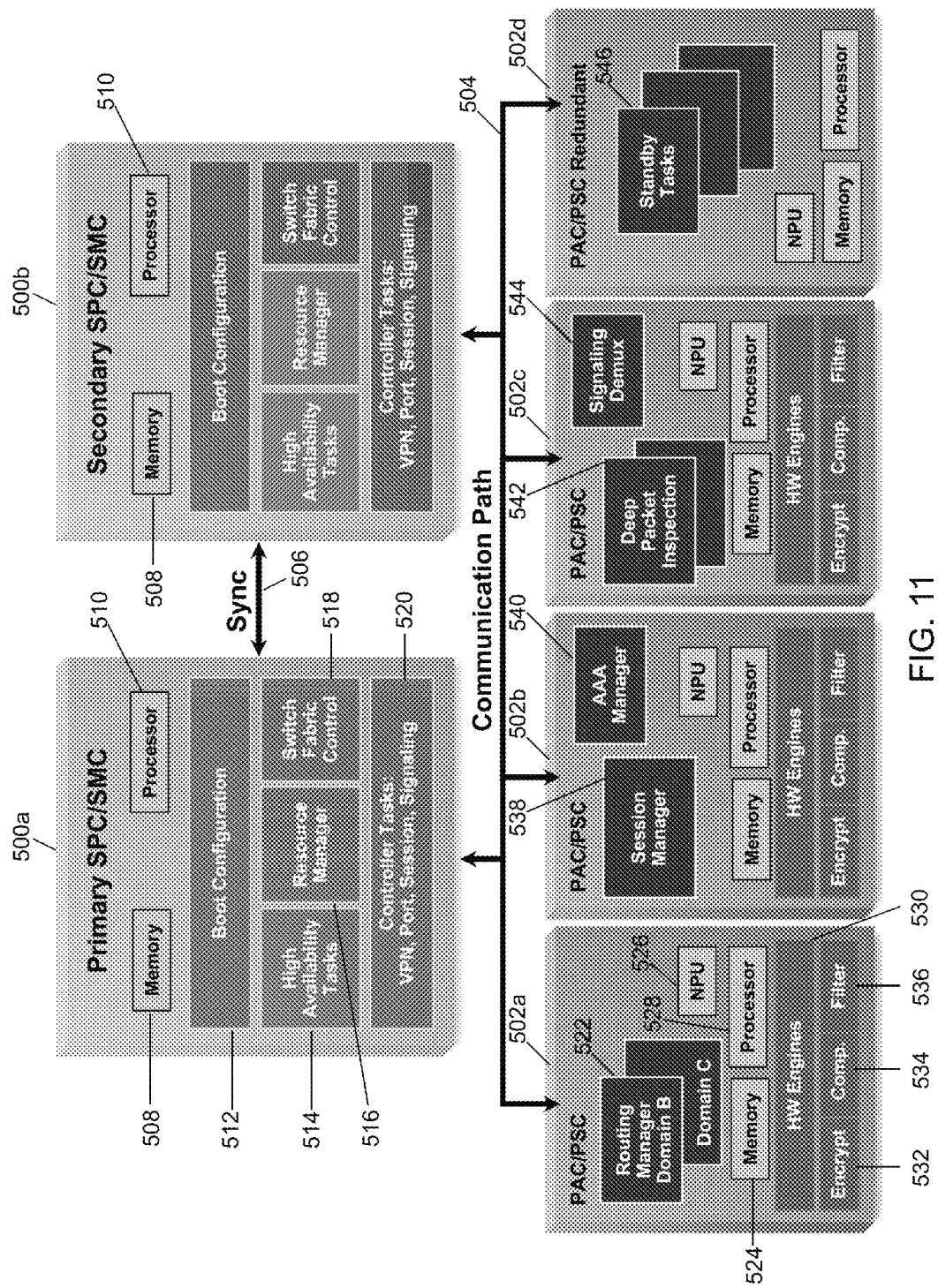
FIG. 11 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 11 illustrates a logical view of the software architecture of a network device in accordance with certain embodiments. As shown, the software and hardware can be distributed within the network device and across different circuit boards, processors, and memory. FIG. 11 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for UE 134.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more UE 134. A session allows a UE 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the popularity tracking module can be placed in a gateway. https://imc-apps:8002/sonora/Home

We claim:

1. A method comprising:
   receiving a first data request from a mobile device, wherein the first data request includes an identifier of requested data;
   analyzing two or more of a layer 4 (L4) header, a layer 5 (L5) header, a layer 6 (L6) header, and a layer 7 (L7) header of the first data request to determine that the first data request is a request for a video flow;
   sending a second data request to a content adaptation engine (CAE) from which an adapted version of the requested data can be retrieved, wherein the second data request includes the identifier of the requested data;
   receiving an adapted version of the requested data from the CAE; and
   sending the adapted version of the requested data to the mobile device.

2. The method of claim 1, further comprising selecting the CAE from a plurality of CAEs based on load condition associated with one or more of the plurality of CAEs.

3. The method of claim 2, further comprising:
   determining, at the selected CAE, that the adapted version of the requested data is available at a video cache in communication with the selected CAE; and
   retrieving the adapted version of the requested data from the video cache.

4. The method of claim 1, wherein the second data request includes the identifier of the requested data and further includes as an X-header (1) an Internet protocol (IP) address of a server from which the requested data can be downloaded and (2) an IP address of the mobile device.

5. The method of claim 1, wherein analyzing the two or more L4-L7 headers of the first data request includes matching the L7 header of the first data request to one of first predetermined set of stored tags associated with videos.

6. The method of claim 5, further comprising:
   storing a copy of the first data request in a local memory;
   forwarding the first data request to a destination address indicated by the first data request; and
   receiving a response to the first data request and the requested data.

7. The method of claim 6, further comprising analyzing two or more of a layer 4 (L4) header, a layer 5 (L5) header, a layer 6 (L6) header, and a layer 7 (L7) header of the response to the first data request to determine that the data flow associated with the first data request is a video flow.

8. The method of claim 7, wherein analyzing the two or more L4-L7 headers of the response to the first data request includes matching a header of the response to one of known video types.

9. The method of claim 7, further comprising preparing the second data request using the stored copy of the first data request in the local memory.

10. A network device comprising:
    one or more interfaces configured to provide communication with a mobile device, a content adaptation engine (CAE), and an application server; and
    a processor, in communication with the one or more interfaces, and configured to run a module stored in memory that is configured to receive a first data request including an identifier of requested data, analyze two or more of a layer 4 (L4) header, a layer 5 (L5) header, a layer 6 (L6) header, and a layer 7 (L7) header in the first data request to determine that a data flow associated with the first data request is a video flow, send, to the CAE, a second data request including the identifier of the requested data, and receive an adapted version of the requested data from the selected CAE.

11. The network device of claim 10, wherein the module is configured to select the CAE from a plurality of CAEs based, at least in part, on a load condition of the at least one CAE.

12. The network device of claim 10, wherein the module is configured to select the CAE from a plurality of CAEs based, at least in part, on a round-robin mode.

13. The network device of claim 10, wherein the module configured to analyze two or more L4-L7 headers of the first data request includes a module configured to match the L7 header in the first data request to one of predetermined tags that are known to be associated with videos.

14. The network device of claim 10, wherein the module is further configured to store a copy of the first data request in a local memory, forward the first data request to a destination address indicated by the first data request, and receive a response to the first data request and the requested data.

15. The network device of claim 14, wherein the module is further configured to analyze two or more of a layer 4 (L4) header, a layer 5 (L5) header, a layer 6 (L6) header, and a layer 7 (L7) header in the response to the first data request to determine that the data flow associated with the first data request is a video flow.

16. The network device of claim 15, wherein the module is further configured to prepare the second data request using the copy of the first data request in the local memory.

17. Logic encoded on one or more non-transitory media for execution and when executed operable to cause an apparatus to:
    receive a first data request from a mobile device, wherein the first data request includes an identifier of requested data;
    analyze two or more of a layer 4 (L4) header, a layer 5 (L5) header, a layer 6 (L6) header, and a layer 7 (L7) header in the first data request to determine that a data flow associated with the first data request is a video flow;
    send a second data request to a content adaptation engine (CAE) from which an adapted version of the requested data can be retrieved, wherein the second data request includes the identifier of the requested data;
    receive an adapted version of the requested data from the CAE; and
    send the adapted version of the requested data to the mobile device.

18. The logic of claim 17, wherein the logic operable to select the CAE from a plurality of CAEs on a load condition of one or more of the plurality of CAEs.

19. The logic of claim 17, wherein the logic operable to analyze two or more of the L4-L7 headers in the first data request includes a logic operable to match the L7 header in the first data request to one of predetermined tags that are known to be associated with videos.

20. The logic of claim 17, wherein the logic is further operable to store a copy of the first data request in a local memory, to forward the first data request to a destination address indicated by the first data request, to receive a response to the first data request, and to analyze two or more of a layer 4 (L4) header, a layer 5 (L5) header, a layer 6 (L6) header, and a layer 7 (L7) header in the response to the first data request to determine if the data flow associated with the first data request is a video flow.

* * * * *